US012337605B2

(12) United States Patent
Liu et al.

(10) Patent No.: US 12,337,605 B2
(45) Date of Patent: Jun. 24, 2025

(54) INTEGRATED SENSOR ASSEMBLY FOR MEDIA PROCESSING DEVICES

(71) Applicant: ZEBRA TECHNOLOGIES CORPORATION, Lincolnshire, IL (US)

(72) Inventors: Yong Liu, Guangzhou (CN); Huanhua Liao, Guanghzou (CN); Yunbo Yuan, Guangzhou (CN)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/673,529

(22) Filed: May 24, 2024

(65) Prior Publication Data

US 2024/0308239 A1 Sep. 19, 2024

Related U.S. Application Data

(63) Continuation of application No. 17/580,133, filed on Jan. 20, 2022, now Pat. No. 11,993,088.

(51) Int. Cl.
*B41J 2/325* (2006.01)

(52) U.S. Cl.
CPC .................................... *B41J 2/325* (2013.01)

(58) Field of Classification Search
CPC ..... B41J 2/325; B41J 2/32; B41J 2/315; B41J 29/00; B41J 29/023; B41J 29/026; B41J 29/02; B41F 16/00; B41F 16/0006; B41F 16/0026; B41F 16/0033
See application file for complete search history.

(56) References Cited

U.S. PATENT DOCUMENTS

| | | | | |
|---|---|---|---|---|
| 5,777,652 A * | 7/1998 | Takeuchi | B41J 35/22 347/171 |
| 2012/0301202 A1* | 11/2012 | Bouverie | H04N 1/00779 400/583 |
| 2020/0145546 A1* | 5/2020 | Alaganchetty | H04N 1/00652 |
| 2021/0213761 A1* | 7/2021 | Takahashi | B41J 11/0095 |

* cited by examiner

*Primary Examiner* — Kristal Feggins

(57) ABSTRACT

A media processing device includes: a print head; a housing supporting the print head, and defining chambers to receive a media supply, and a ribbon supply; a media guide coupled to the housing, and defining a portion of a media path extending from the media supply to the print head; a first sensor support affixed to the media guide on a first side of the media path, between the media path and a ribbon path extending from the ribbon chamber to the print head; a ribbon sensor on a ribbon-facing side of the first sensor support; a first media sensor on an opposite, media-facing side of the first sensor support; a second sensor support affixed to the media guide on a second side of the media path, opposite the first side of the media path; and a second media sensor on a media-facing side of the second sensor support.

11 Claims, 7 Drawing Sheets

INTEGRATED SENSOR ASSEMBLY FOR MEDIA PROCESSING DEVICES

RELATED APPLICATIONS

The present application is a continuation of U.S. patent application Ser. No. 17/580,133, filed on Jan. 20, 2022, the disclosure of which is incorporated by reference herein in its entirety.

BACKGROUND

Media processing devices, such as thermal transfer label printers, may include various optical sensors. Some sensors can monitor a supply of pigment-carrying ribbon (e.g., to detect when the ribbon is exhausted), while others can detect boundaries on the media being processed (e.g., boundaries between labels from a media supply of the printer). The provision of such sensors, however, may complicate the manufacture and assembly of the printers.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
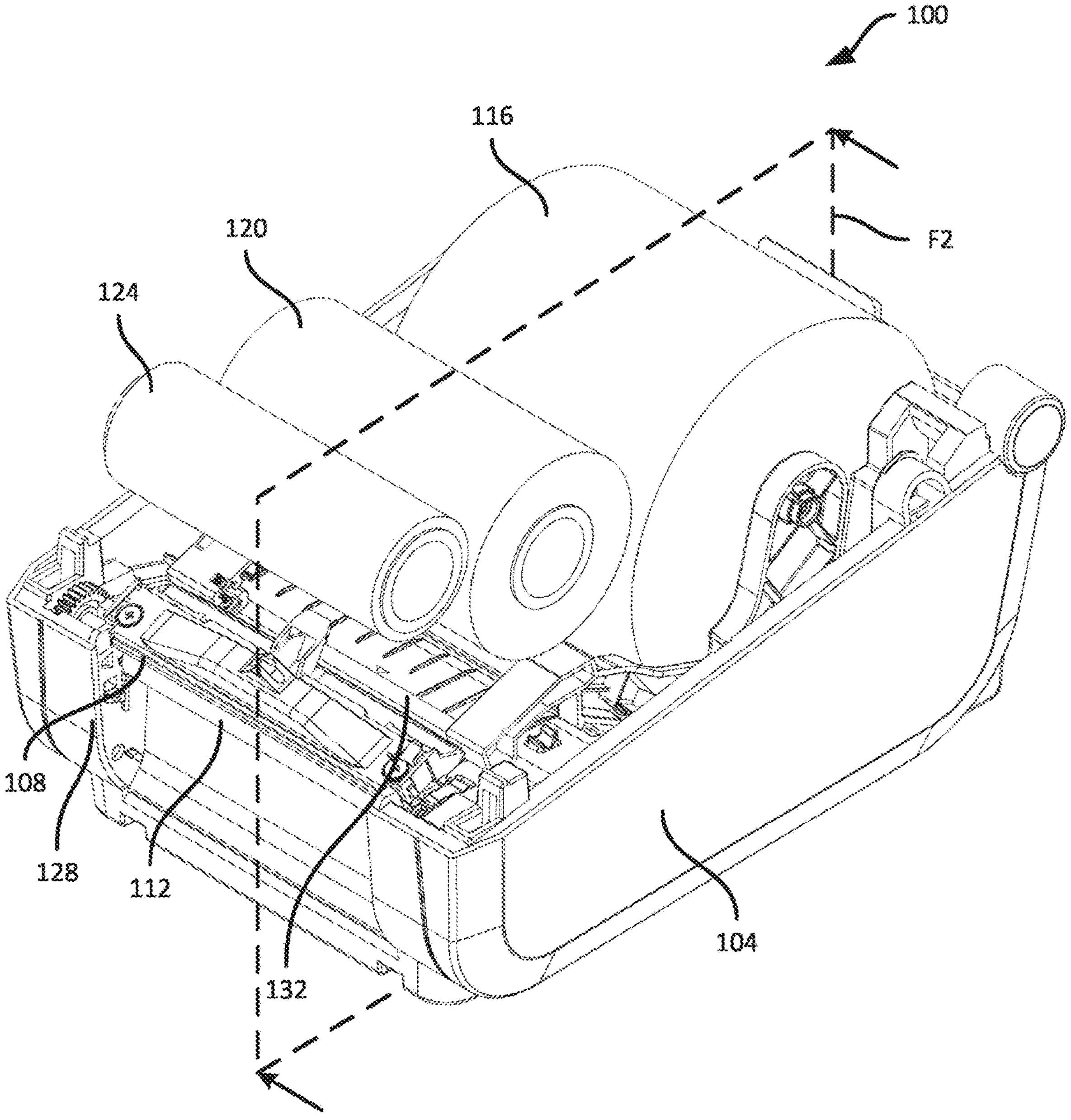
FIG. 1 is an isometric view of a media processing device, with a cover thereof omitted.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a media processing device, comprising: a print head; a housing supporting the print head, and defining (i) a media chamber configured to receive a media supply, and (ii) a ribbon chamber configured to receive a supply of ribbon; a media guide coupled to the housing, the media guide defining a portion of a media path extending from the media supply to the print head; a first sensor support affixed to the media guide on a first side of the media path, the first side located between the media path and a ribbon path extending from the ribbon chamber to the print head; a ribbon sensor on a ribbon-facing side of the first sensor support; a first media sensor on an opposite, media-facing side of the first sensor support; a second sensor support affixed to the media guide on a second side of the media path, opposite the first side of the media path; and a second media sensor on a media-facing side of the second sensor support.

Additional examples disclosed herein are directed to a media processing device, comprising: a print head; a housing supporting the print head, and defining a media chamber configured to receive a media supply; a media guide coupled to the housing, and defining a portion of a media path extending from the media supply to the print head; a sensor support affixed to the media guide on a first side of the media path; a first sensor on a first side of the sensor support; and a media sensor on a second side of the sensor support, opposite the first side.

FIG. 1 illustrates a media processing device 100, such as a printer. The device 100 includes a housing 104 supporting various other components of the device 100, and a cover that is omitted from FIG. 1 to reveal certain internal components. The device 100 is a thermal transfer printer, in which pigment is transferred from a pigment-carrying ribbon onto media (e.g., labels, paper, or the like) at a nip formed by a print head 108 and a platen roller 112. The print head 108 is supported by the cover mentioned above (not shown), and when the cover is opened, the print head 108 therefore disengages from the platen roller 112 to enable placement of media between the print head 108 and the platen roller 112.

The print head 108, for example, can include a set of controllable thermal elements, e.g. a linear array of such elements extending across a media path. The platen roller 112 can pull media from a media supply 116 (e.g., a roll of paper, labels, or the like) disposed in a media chamber defined within the housing 104, along the media path, towards the above-mentioned nip. A pigment-carrying ribbon also traverses the nip together with the media (e.g., in contact with the media). The ribbon, for example, can travel along a ribbon path from a ribbon supply 120 (e.g. a rotatable spool), to the print head, and then to a take-up spool 124. The ribbon supply 120 and take-up spool 124 are supported by the cover (not shown) in this example, e.g. within a ribbon chamber formed by the cover.

As the media and the ribbon traverse the nip formed by the platen roller 112 and the print head 108, the above-mentioned thermal elements are controlled (e.g., by a controller supported within the housing 104) to heat specific portions along the media path. Under the effect of heat generated by the thermal elements, and the pressure exerted by the nip, pigment carried on the ribbon can be transferred to the media, resulting in the impression of indicia on the media. The media then exits the device 100, e.g., via an outlet defined in a forward wall 128 of the housing 104.

The housing 104 can include various internal guide surfaces, such as a guide wall 132, that define the media path mentioned above, to guide the media from the supply 116 towards the nip, e.g., under the action of the platen roller 112.

Figure 2:
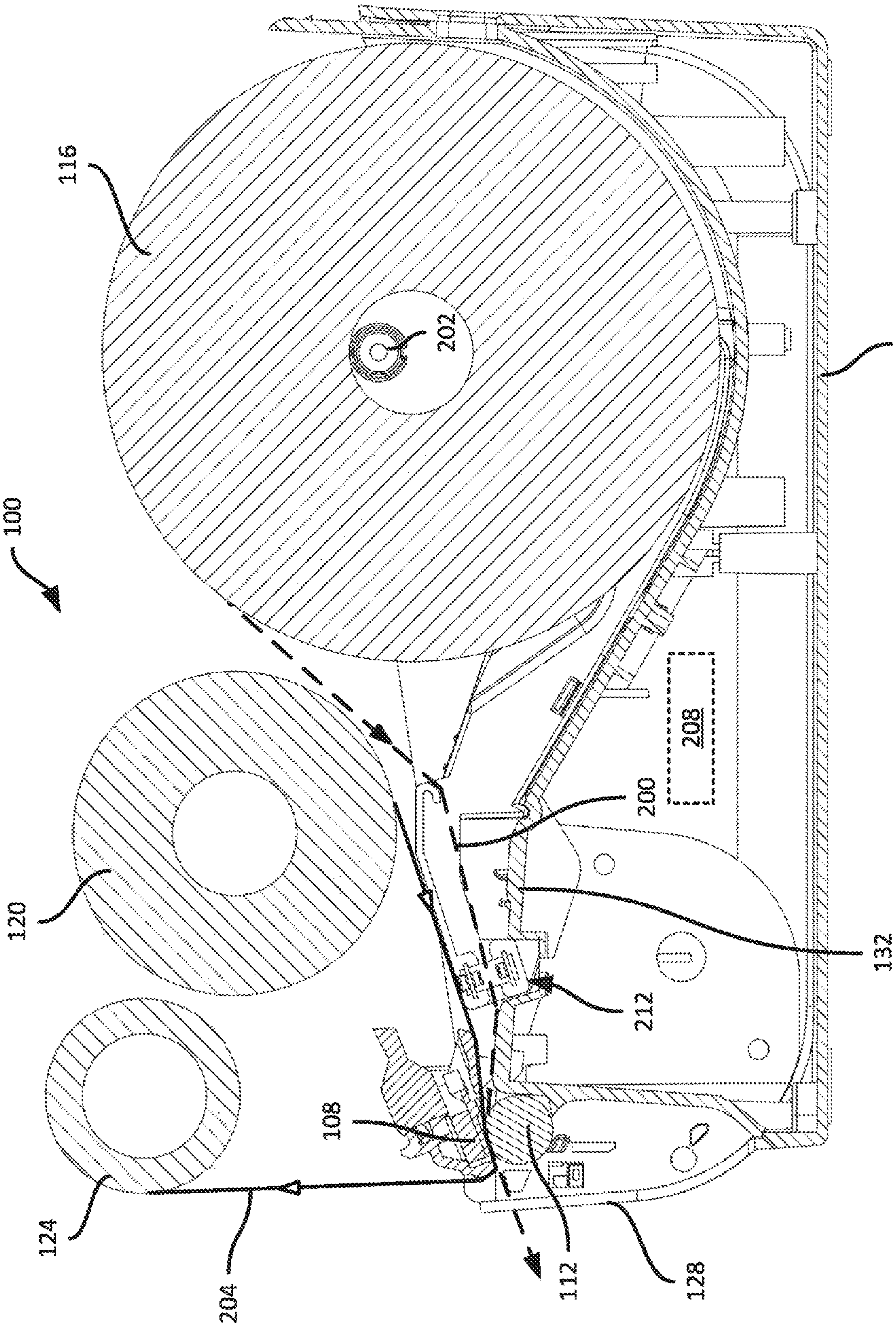
FIG. 2 is a cross-sectional view of the media processing device of FIG. 1.

FIG. 2 illustrates a cross-sectional view of the device 100, taken at the plane F2 as shown in FIG. 1. In addition to the components noted above, FIG. 2 illustrates a media path 200, illustrated with dashed lines and dark arrows. The media path 200 extends from a media chamber defined within the housing 104 (and containing the media supply 116, e.g., in the form of a media spool rotatably supported on a spindle 202) to the platen roller 112 and the print head 108. FIG. 2 also illustrates a ribbon path 204, illustrated with solid lines and light arrows. The ribbon path 204 extends from the ribbon supply 120, to the print head 108 and platen roller 112, and terminates at the ribbon take-up spool. The ribbon take-up spool can be driven in some examples, to mitigate against the development of slack in the ribbon between the print head 108 and the take-up spool 124.

As seen in FIG. 2, the media path 200 and the ribbon path 204 are separated before and after the nip formed by the print head 108 and the platen roller 112, but are brought into engagement as the ribbon and the media traverse the nip, as mentioned above.

As will be apparent to those skilled in the art, the device 100 can include a variety of sensors enabling a controller 208 positioned within the housing 104 to detect media and ribbon status, e.g., including errors such as media jams or exhausted ribbon, as well as to detect boundaries between portions of the media, such as individual labels. The above-mentioned sensors can be implemented as optical sensors. For example, the device 100 can include a ribbon sensor including an optical emitter, such as an infrared or near-infrared light emitting diode (LED), as well as an optical detector, such as a photodiode. The emitter is configured to emit light towards the ribbon path, and based on the intensity of reflected light detected at the detector, the controller 208 can determine whether the ribbon is exhausted (e.g., whether usable ribbon, i.e., ribbon with ink or other pigment, is present along the ribbon path 204).

The device 100 can also include a blackline sensor including another optical emitter and a corresponding optical detector, disposed on the same side of the media path 200 as one another. The blackline sensor can be configured to illuminate a portion of the media along the media path, in order to detect dark portions (e.g., black blocks or lines) on the media that indicate boundaries between separately printable portions of the media, such as labels. Further, the device 100 can include a gap sensor including an optical emitter and an optical detector disposed on opposite sides of the media path 200 from one another. The gap sensor can, in some examples, share the optical emitter of the blackline sensor, and therefore can include an optical detector opposite the emitter of the blackline sensor. The gap sensor enables the controller 208 to detect boundaries between labels or other portions of the media, e.g., for media with cutouts between those portions. The gap sensor can also be employed to detect an exhausted media supply, e.g., when an unexpected gap is detected.

In some other media processing devices, the above-mentioned sensors are disposed at various distinct positions within the housing of the device, and are therefore each mounted on distinct supports, such as printed circuit boards (PCBs). During manufacture of such devices, therefore, several (e.g., three) distinct PCBs are installed into the housing, and separate electrical conduits (e.g., cables, wires and the like) are routed through the housing from the location of each sensor to the controller 208. The device 100, in contrast, includes an integrated sensor assembly 212 that enables the use of a reduced number of parts in the manufacture of the device in comparison with the other devices mentioned above. The integrated sensor assembly 212 may also enable reduced complexity in the assembly of the device 100.

Figure 3:
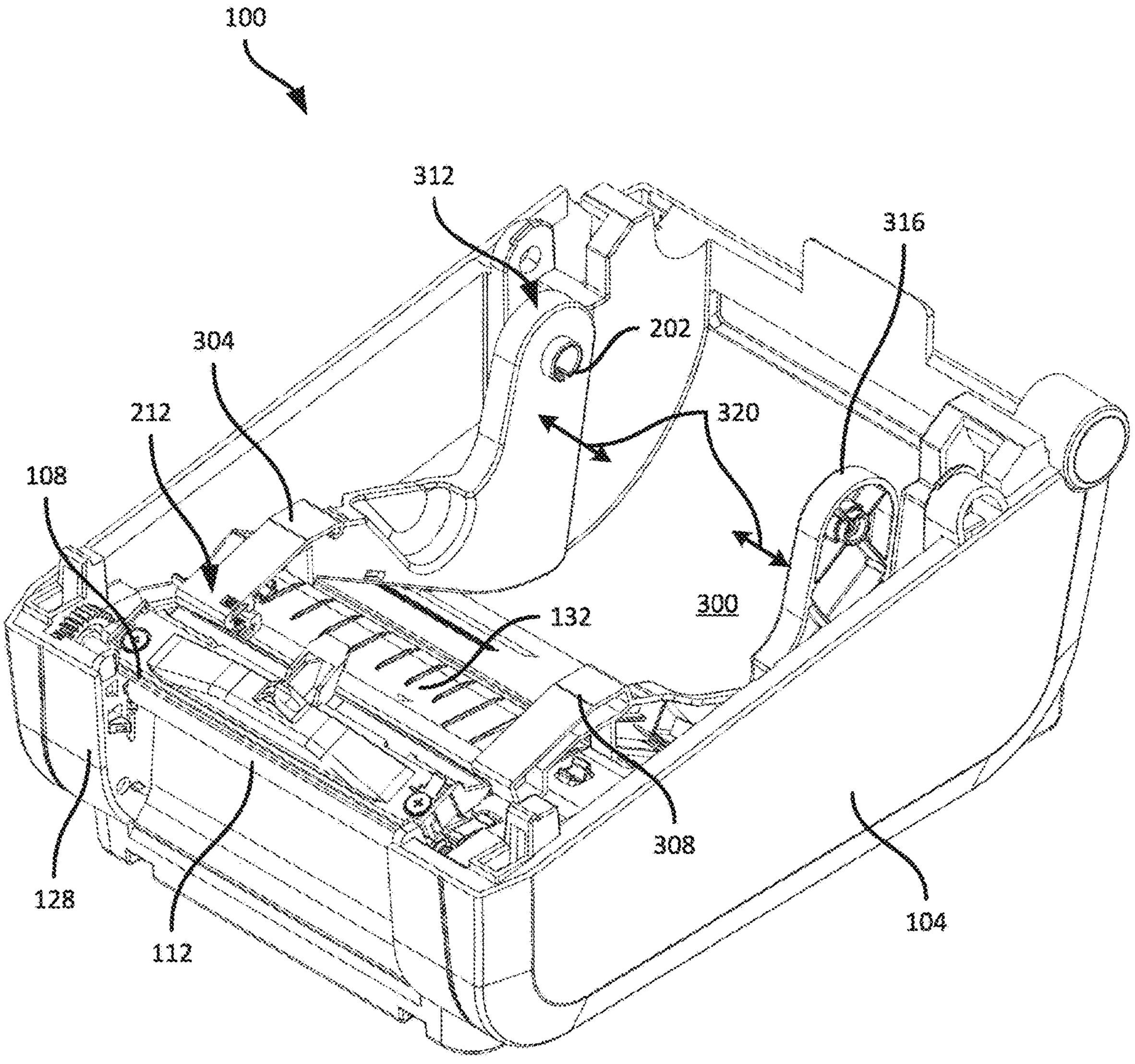
FIG. 3 is a an isometric view of the media processing device of FIG. 1, with media and ribbon supplies thereof omitted.

Turning to FIG. 3, the device 100 is shown with the media supply 116, the ribbon supply 120, and the ribbon take-up spool 124 omitted to reveal a cavity 300 configured to receive the media supply 116. As seen in FIG. 3, the device 100 includes a first media guide 304 and a second media guide 308, disposed at opposite sides of the media path. The media guides 304 and 308 thus serve to reduce deviation of the media towards either side of the device 100 as the media travels along the media path. In this example, the media guides 304 and 308 are extensions of a first media holder 312, and a second media holder 316 (e.g., guide arms extending from respective bodies of the media holders 312 and 316). In other examples, the media guides 304 and 308 can be distinct from the media holders 312 and 316.

The media holders 312 and 316 are disposed at either side of the cavity 300, and include spindles to support the media supply 116. The spindle 202, as shown previously in FIG. 2, is visible on the media holder 312. The media holders 312 and 316 can also, in some examples, be movable in a sideways direction, as indicated by the arrows 320, to alter the width of the media path 200, e.g., enabling the device 100 to accept media supplies 116 of different widths.

As seen in FIG. 3, the sensor assembly 212 is integrated with the media guide 304. As will be apparent in the discussion below, the sensor assembly 212 can therefore be assembled to the media guide 304, and the media guide 304 can then be assembled to the housing 104 as a unit (carrying the sensor assembly 212), which may reduce the number and complexity of assembly steps to manufacture the device 100.

Figure 4:
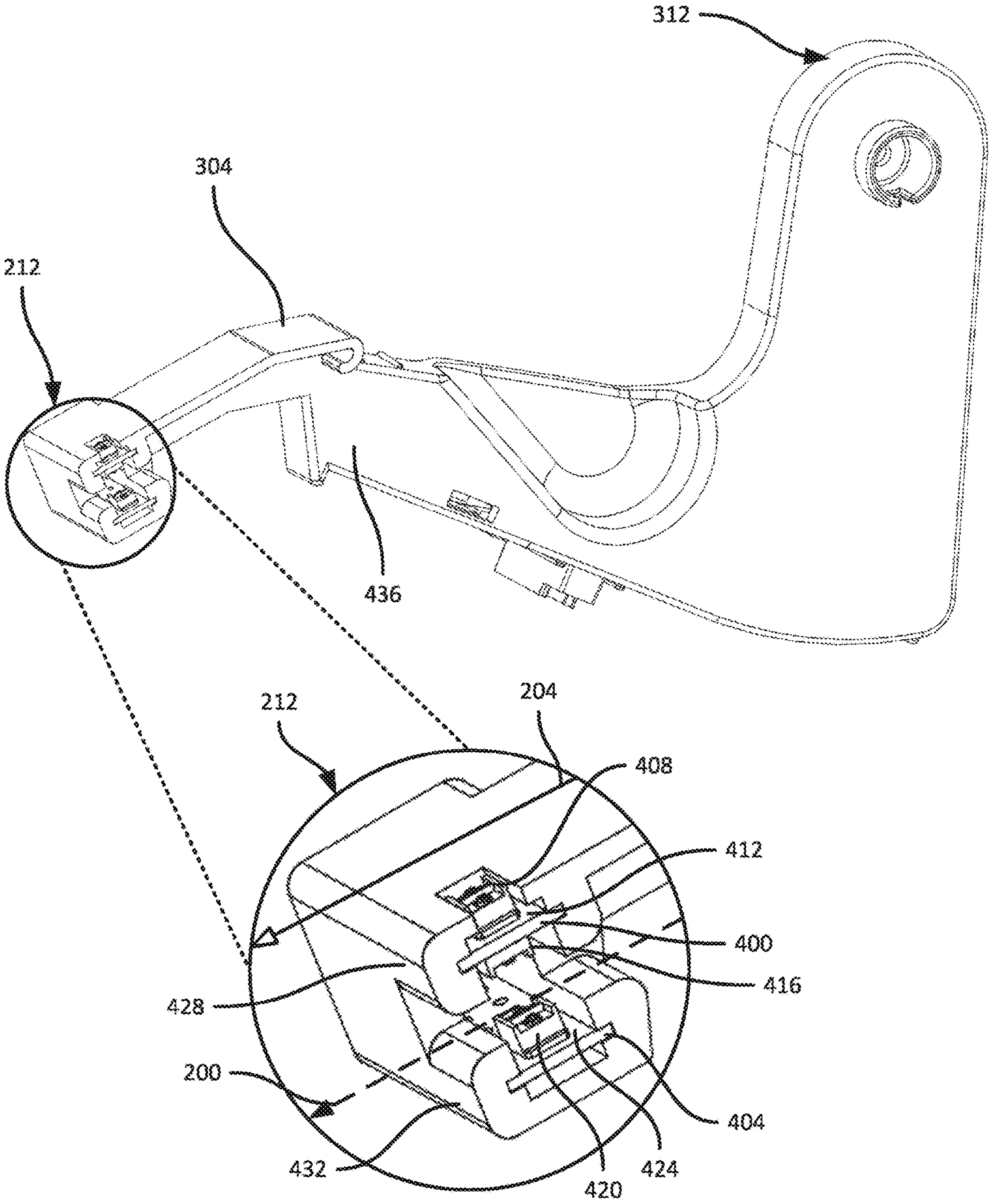
FIG. 4 is a diagram of a media holder of the media processing device of FIG. 1.

Turning to FIG. 4, the media holder 312 is shown in isolation, illustrating the sensor assembly 212 in greater detail. In particular, the sensor assembly 212 includes a first sensor support 400 affixed to the media guide 304 on a first side of the media path 200, and a second media support 404 affixed to the media guide 304 on a second, opposite, side of the media path 200. Each of the sensor supports 400 and 404 can include respective PCBs. The first sensor support 400 is therefore placed between the media path 200 and the ribbon path 204, while the second sensor support 404 is separated from the ribbon path 204 by the media path 200. Further, as will be apparent from FIG. 4, the first and second sensor supports 400 and 404 are substantially symmetrical relative to the media path 200. As a result, the optical paths of certain sensors supported on the supports 400 and 404 coincide with one another.

The first sensor support 400 includes a ribbon sensor 408 on a ribbon-facing side 412 of the support 400, and a first media sensor (e.g., either a blackline sensor or a gap sensor) 416 on a media-facing side of the support 400, opposite the ribbon-facing side 412. That is, the sensors 408 and 416 are both disposed on the same sensor support 400, albeit on opposite sides thereof, to face either the ribbon path 204 or the media path 200.

The second sensor support 404, meanwhile, includes a second media sensor 420 disposed on a media-facing side 424 of the support 404. The second media sensor 420 therefore faces the media path 200, but from the opposite side of the media path 200 than the first media sensor 416. When the first media sensor 416 is a blackline sensor, the second media sensor 420 is a gap sensor, such that the gap sensor can make use of the emitter of the blackline sensor. Alternatively, when the first media sensor 416 is a gap sensor, the second media sensor 420 is a blackline sensor, thus also enabling the gap sensor to make use of the emitter of the blackline sensor.

Figure 5:
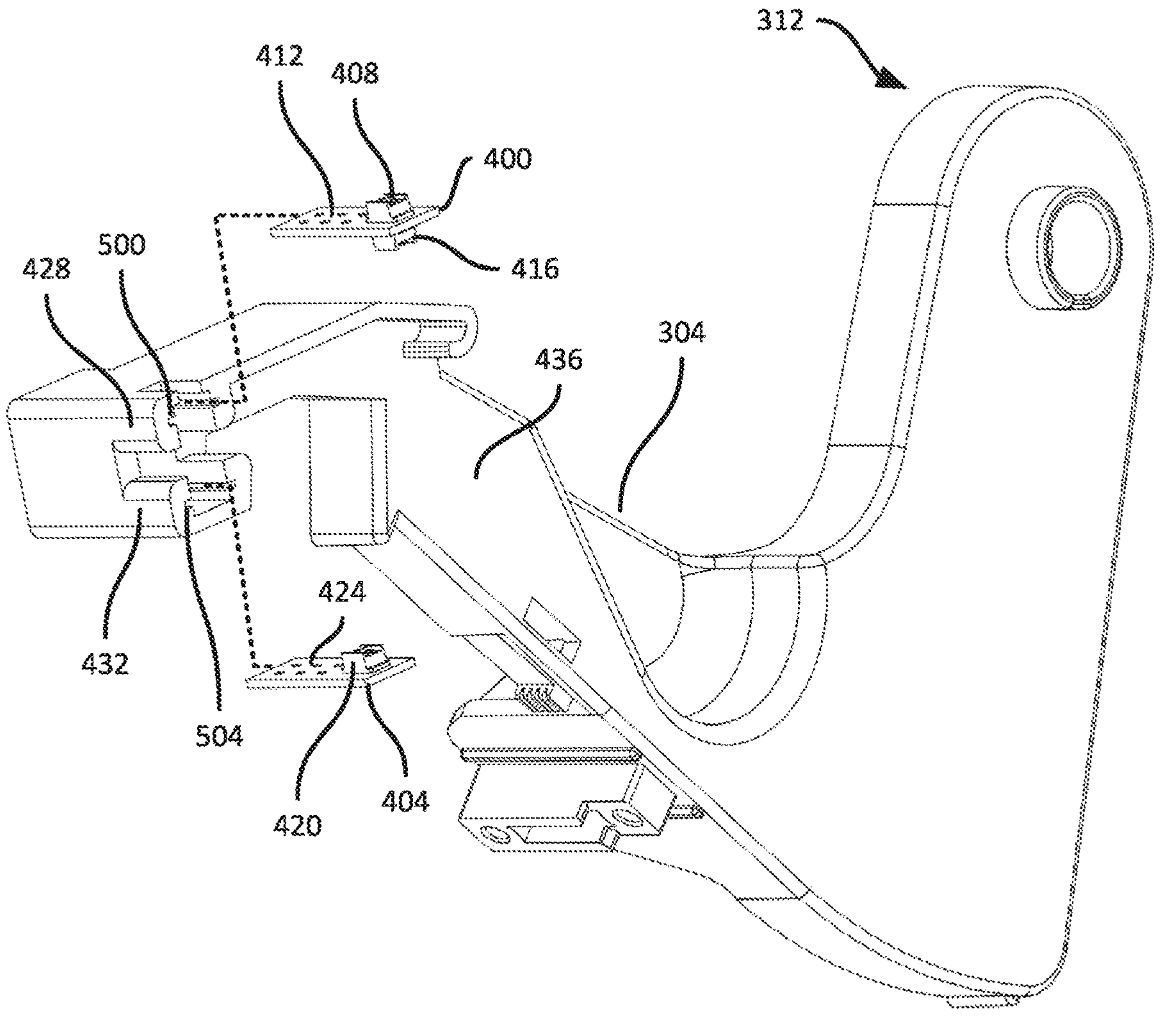
FIG. 5 is an exploded diagram of the media holder of FIG. 4.

The first and second sensor supports 400 and 404 are affixed to the media guide 304 via respective carriages 428 and 432, extending from an inner surface 436 of the media guide 304. Turning to FIG. 5, which illustrates an exploded view of the sensor assembly 212, each carriage 428 and 432 includes a slot configured to receive a sensor support. Thus, the carriage 428 includes a slot 500 to receive the first support 400, and the carriage 432 includes a slot 504 to receive the second support 404. The supports 400 and 404 can be affixed within the slots 500 and 504 by press-fitting, adhesives, or the like. As will therefore be apparent, the supports 400 and 404, with the sensors 408, 416, and 420 mounted thereto, can be affixed within the slots 500 and 504 prior to installation of the media holder 312 into the housing 104.

Figure 6:
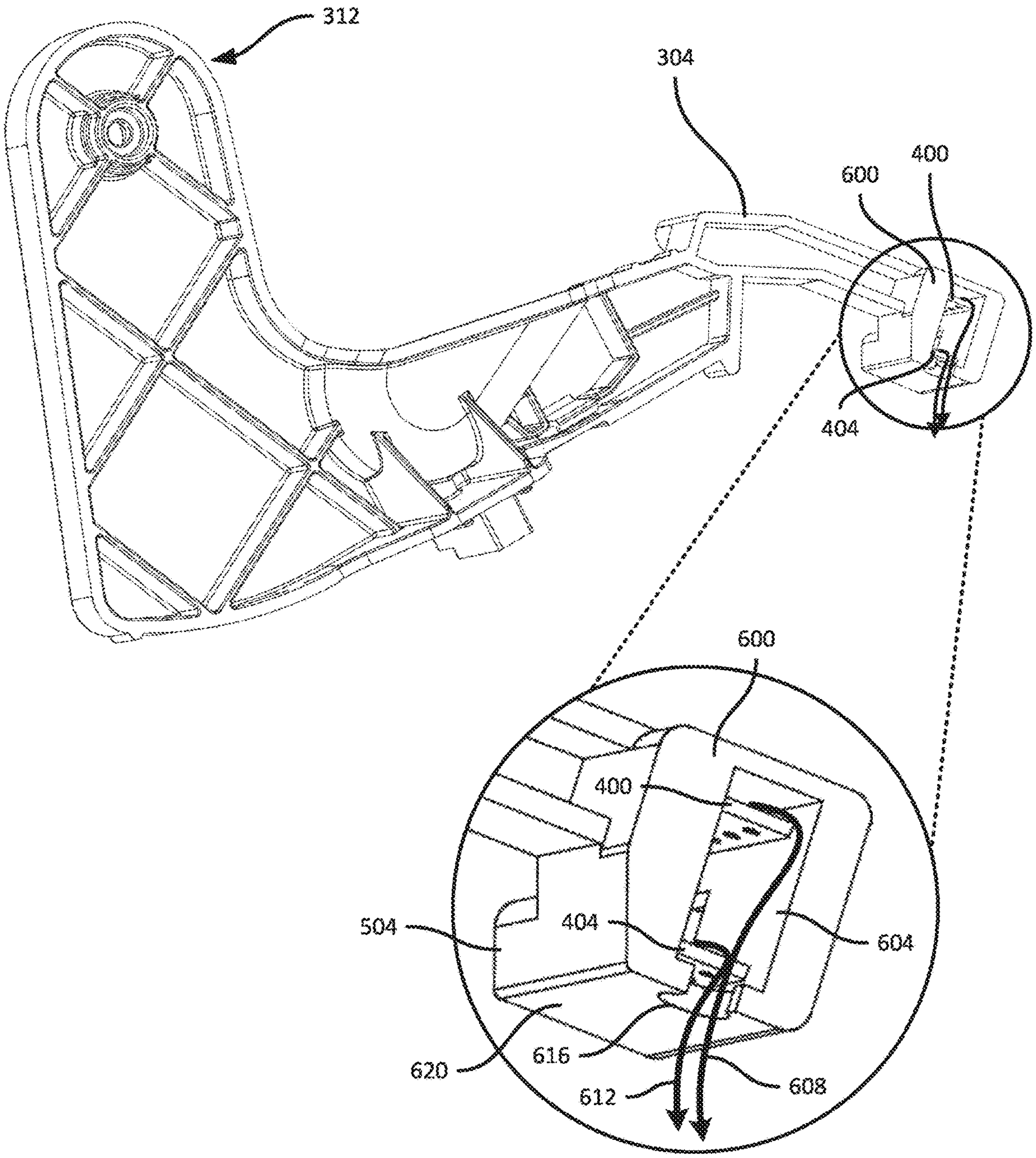
FIG. 6 is a diagram illustrating an opposite side of the media holder of FIG. 4.

Turning to FIG. 6, an outer side of the media holder 312 is shown, including an outer surface 600 opposite to the inner surface 436 shown in FIG. 4 and FIG. 5. As seen in FIG. 6, the media guide 304 includes an opening 604 extending from the inner surface 436 to the outer surface 600 (i.e., traversing the media guide 304). The sensor supports 400 and 404 are therefore open to the outer side of the media guide 304, and electrical conduits 608 and 612 can exit the media guide 304 via the opening 604. In some examples, the conduits 608 and 612 can travel through an opening 616 in a lower surface 620 of the media guide 304. In any event, the sensor assembly 212 provides a common conduit path for the conduits 608 and 612. Although two conduits are shown in FIG. 6, it will be apparent that in some examples, more than one wire, cable, or the like can be connected to each of the sensor supports 400 and 404. Each such conduit can travel away from the sensor assembly 212 to the controller 208 via substantially the same common conduit path. That is, the installation of cabling or other electrical connections between the sensors 408, 416, and 420 and the controller 208 may be simplified by the provision of a common path for such cabling.

Figure 7:
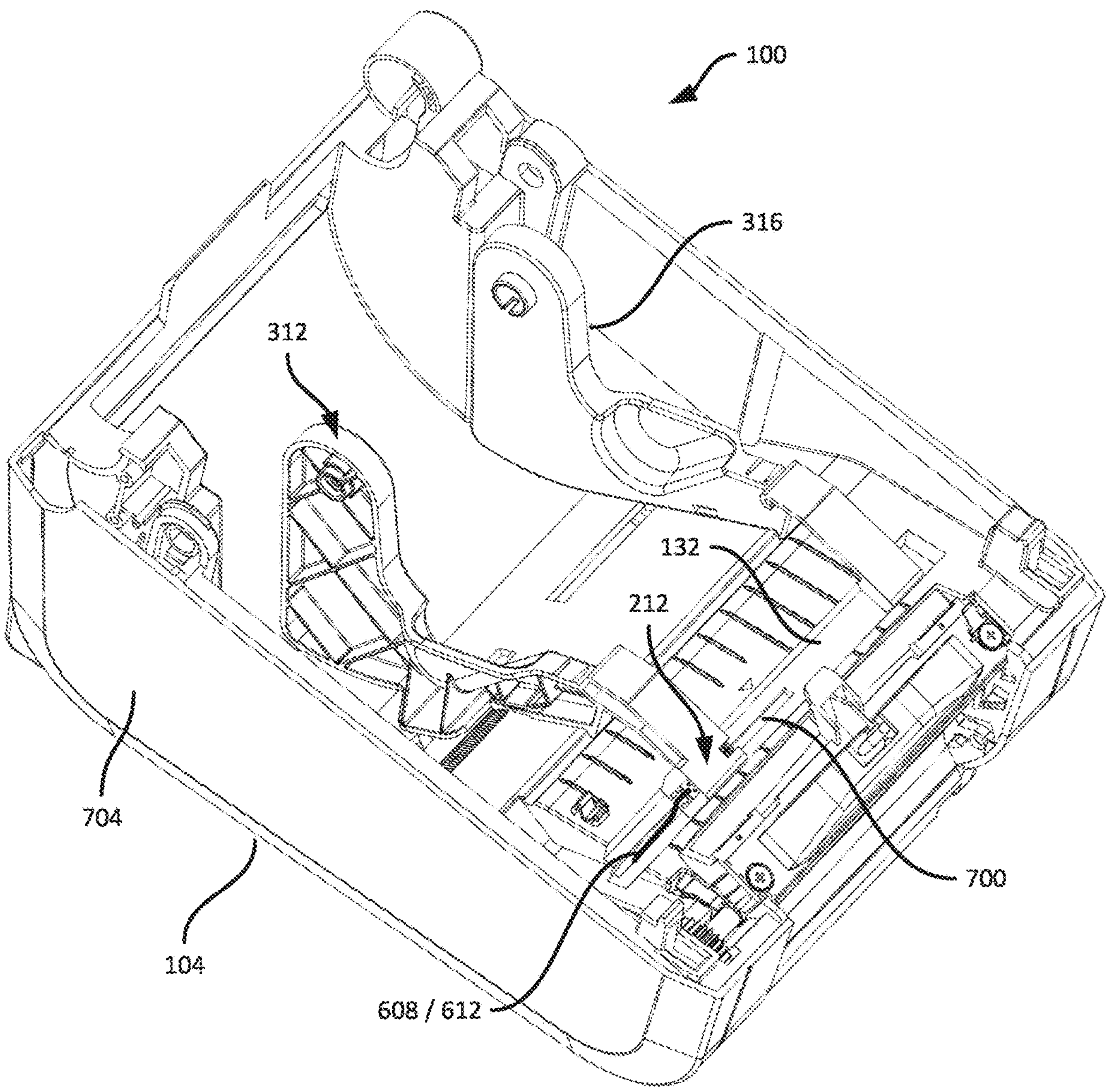
FIG. 7 is a diagram of the media processing device of FIG. 1, illustrating an electrical conduit path thereof.

Turning to FIG. 7, in some embodiments, in which the controller 208 is in the housing 104 below the guide surface 132 (as shown in FIG. 2), the guide surface 132 can include a slot 700 therein to permit passage of the conduits 608 and 612 from the sensor assembly 212 towards the controller 208. The slot 700 may therefore reduce the length of conduit necessary, and may also further simplify connection of the sensor assembly 212 to the controller 208. As shown in FIG. 7, the media holder 312 has been shifted inwards (away from an outer wall 704 of the housing 104) to show the extent of the slot 700. The length of the slot 700 can be selected, for example, to enable passage of the conduits 608 and 612 therethrough at any of various positions of the media holder 312, when the media holder 312 is movable as in this example.

In other embodiments, the sensor assembly 212 can omit the second sensor support 404. In such examples, the second sensor support 404, carrying the second media sensor 420, can be mounted on the guide surface 132, or another portion of the housing 104. In further embodiments, the ribbon sensor may be replaced or supplemented with any other suitable sensor. For instance, in some embodiments the device 100 is a direct thermal printer, and therefore does not have a ribbon. The ribbon sensor can be replaced, in such embodiments, with an environmental sensor (e.g., temperature and/or humidity), an optical sensor to monitor a separate component of the device, or the like.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A media processing device, comprising:

a media path along which media is processed;

a ribbon path along which a ribbon is processed, the media path and the ribbon path converging as the media path and the ribbon path approach a nip formed by a printhead and a platen roller and diverging after the media path and the ribbon path pass through the nip;

a media guide having an inner surface defining a boundary of the media path, a first carriage extending from the inner surface to position the first carriage between the media path and the ribbon path;

a first sensor element orientated in the first carriage in a first direction to sense the media along the media path; and a second sensor element oriented in the first carriage in a second direction to sense the ribbon along the ribbon path.

2. The media processing device of claim 1, wherein the media guide comprises:

a media holder including a spindle to support the media supply; and a guide arm extending along the media path, the first carriage extending from the guide arm.

3. The media processing device of claim 2, wherein the media holder is movable relative to the housing.

4. The media processing device of claim 1, wherein the media guide comprises:

a second carriage extending from the inner surface for receiving the third sensor element, the second carriage opposingly spaced from the first carriage such that the first and second carriages are disposed on opposite sides of the media path.

5. The media processing device of claim 4, further comprising:

a controller; and a set of electrical conduits operatively coupling the first and second sensor elements to the controller;

wherein the media guide includes an opening adjacent to the first carriage; and wherein the electrical conduits extend through the opening towards the controller along a common conduit path.

6. The media processing device of claim 5, further comprising:

a guide surface adjacent to the media guide; and wherein the guide surface includes a slot defining a portion of the common conduit path.

7. The media processing device of claim 1, wherein the first and third sensor elements are substantially symmetrical relative about the media path.

8. The media processing device of claim 7, wherein the first sensor element includes a gap sensor with a first optical detector; and wherein third sensor element includes a blackline sensor with an optical emitter and a second optical detector.

9. The media processing device of claim 7, wherein the first sensor element includes a blackline sensor with an optical emitter and a first optical detector; and wherein the third sensor element includes a gap sensor with a second optical detector.

10. The media processing device of claim 1, wherein the second sensor element includes an optical emitter.

11. A method comprising:

defining a media path, within a media processing device along which media is processed;

defining a ribbon path, with the media processing device, along which a ribbon is processed, the media path and the ribbon path converging as the media path and the ribbon path approach a nip formed by a printhead and a platen roller and diverging after the media path and the ribbon path pass through the nip;

positioning a media guide, within the media processing device, to defining a boundary of the media path with an inner surface of the media guide, the media guide including a first carriage extending from the inner surface to position the first carriage between the media path and the ribbon path when the media guide is positioned within the media processing device;

orientating a first sensor element in the first carriage in a first direction to sense the media along the media path; and orientating a second sensor element in the first carriage in a second direction to sense the ribbon along the ribbon path.

* * * * *